United States Patent [19]

Giesecke

[11] 4,424,349

[45] Jan. 3, 1984

[54] PROCESS FOR THE PREPARATION OF CATIONIC HYDRAZONE DYESTUFFS

[75] Inventor: Heinz Giesecke, Leverkusen, Fed. Rep. of Germany

[73] Assignee: Bayer Aktiengesellschaft, Leverkusen, Fed. Rep. of Germany

[21] Appl. No.: 375,775

[22] Filed: May 6, 1982

[30] Foreign Application Priority Data

May 26, 1981 [DE] Fed. Rep. of Germany ....... 3120991

[51] Int. Cl.³ .............................................. C09B 23/16
[52] U.S. Cl. .................................................... 542/417
[58] Field of Search ........................ 542/417, 419, 422

[56] References Cited

U.S. PATENT DOCUMENTS

| | | | |
|---|---|---|---|
| 2,749,351 | 6/1956 | Mathes et al. | 260/297 |
| 3,158,608 | 11/1964 | Raue | 260/240 |
| 3,573,287 | 3/1971 | Schorr et al. | 542/417 |
| 3,984,437 | 10/1976 | Fujino et al. | 542/417 |
| 4,026,885 | 5/1977 | Frey et al. | |
| 4,105,768 | 8/1978 | Eriksson et al. | 542/417 |
| 4,237,275 | 12/1980 | Bader et al. | 213/53 |
| 4,322,536 | 3/1982 | Bader et al. | |

FOREIGN PATENT DOCUMENTS 78569 7/1962 France .
1410938 10/1975 United Kingdom .

OTHER PUBLICATIONS

Chemical Abstract, vol. 88, 1978, p. 539.
Chemise Berichte, vol. 90, Sep. 1957, Nitrone Oder Anile, Fritz Krohnke, Heinrich Leister and Isolde Vogt, pp. 2792–2801.

Primary Examiner—Jane T. Fan
Attorney, Agent, or Firm—Sprung, Horn, Kramer & Woods

[57] ABSTRACT

Dyestuffs of the general formula

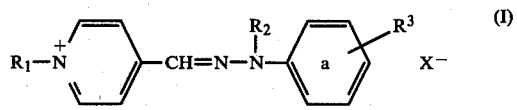

wherein
  $R_1$ denotes alkyl, alkenyl, aralkyl or cycloalkyl,
  $R_2$ denotes hydrogen, alkyl, alkenyl, aryl, aralkyl or cycloalkyl, or alkylene bonded to the ring a,
  $R_3$ denotes hydrogen or one or more non-ionic substituents customary in dyestuff chemistry and
  $X^-$ denotes an anion,
wherein an aromatic or cycloaliphatic ring can be fused to the ring a, and wherein the radicals mentioned can carry non-ionic substituents customary in dyestuff chemistry, are obtained, if 4-methylpyridine is treated with a quaternizing agent of the formula

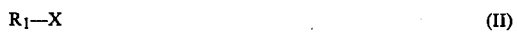

wherein
  X denotes a group which can be split off in the form of the anion $X^-$, within a temperature range from $-20°$ C. up to the boiling point of the system, the resulting reaction product is reacted with a base and a nitrite of the formula

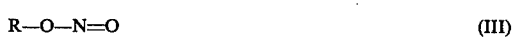

wherein
  R denotes an organic radical, within a temperature range from $-20°$ C. to $+60°$ C., and the product is then reacted, at a pH value below 7, with a hydrazine of the formula

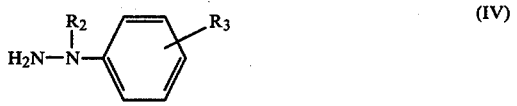

or with a hydrazosulphonate of the formula

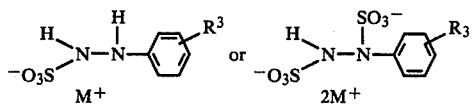

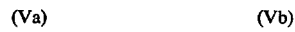

wherein
  $M^+$ represents a monovalent metal cation or an organically substituted ammonium cation or one equivalent of a divalent cation, within a temperature range from $-20°$ C. up to the boiling point of the system, and the product is reacted, if appropriate, if $R_2$ is initially hydrogen and is intended to be different from hydrogen in the final product, with a compound of the formula

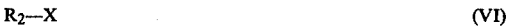

wherein
  $R_2$ denotes alkyl, alkenyl or aralkyl.

11 Claims, No Drawings

PROCESS FOR THE PREPARATION OF CATIONIC HYDRAZONE DYESTUFFS

It has been found that known dyestuffs of the general formula

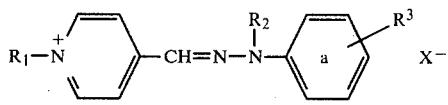

wherein
$R_1$ denotes alkyl, alkenyl, aralkyl or cycloalkyl,
$R_2$ denotes hydrogen, alkyl, alkenyl, aryl, aralkyl or cycloalkyl, or alkylene bonded to the ring a,
$R_3$ denotes hydrogen or one or more non-ionic substituents customary in dyestuff chemistry and
$X^-$ denotes an anion,
wherein an aromatic or cycloaliphatic ring can be fused to the ring a, and wherein the radicals mentioned can carry non-ionic substituents customary in dyestuff chemistry, are obtained in an advantageous manner, if 4-methylpyridine is treated in the presence or absence of an inert solvent with a quaternising agent of the formula $$R_1\text{—}X \qquad (II)$$

wherein
$R_1$ has the abovementioned meaning and
X denotes a group which can be split off in the form of the anion $X^-$,
within a temperature range from $-20°$ C. up to the boiling point of the system, preferably between room temperature and the boiling point, the resulting reaction product, if appropriate without an intermediate isolating stage, is reacted with a base and with a nitrite of the formula $$R\text{—}O\text{—}N\!=\!O \qquad (III)$$

wherein
R denotes an organic radical,
within a temperature range from $-20°$ C. to $+60°$ C., preferably at $0°$ C. to $+20°$ C., and the product is then reacted, at a pH value below 7, preferably below 5, with a hydrazine of the formula

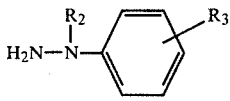

wherein
$R_2$ and $R_3$ have the abovementioned meaning,
or with a hydrazosulphonate of the formula

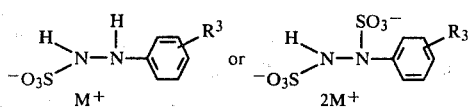

(Va)       (Vb)

wherein $M^+$ represents a monovalent metal cation or a monovalent organically substituted ammonium cation or one equivalent of a divalent cation, and
$R_3$ has the abovementioned meaning,
within a temperature range from $-20°$ C. up to the boiling point of the system, preferably at room temperature up to the boiling point, and the product is reacted, if appropriate, if $R_2$ is initially hydrogen and is intended to be different from hydrogen in the final product, with a compound of the formula $$R_2\text{—}X \qquad (VI)$$

wherein
X has the abovementioned meaning and
$R_2$ denotes alkyl, alkenyl or aralkyl.
Among dyestuffs which can be prepared those dyestuffs are preferred which have the formula

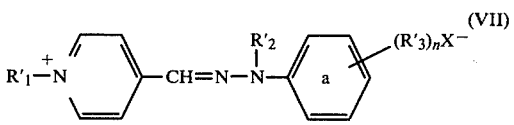

wherein
$R_1'$ denotes $C_1$- to $C_4$-alkyl, $C_3$- to $C_4$-alkenyl, phenyl-$C_1$- to $C_3$-alkyl, cyclopentyl or cyclohexyl,
$R_2'$ denotes hydrogen, $C_1$- to $C_4$-alkyl, $C_3$- to $C_4$-alkenyl, phenyl, phenyl-$C_1$- to $C_3$-alkyl, cyclopentyl or cyclohexyl, or cyclohexylene or $C_2$- or $C_3$-alkylene bonded to the ring a,
$R_3'$ denotes $C_1$- to $C_4$-alkyl, $C_1$- to $C_4$-alkoxy, hydroxyl, chlorine, bromine, nitro, amino, mono- or di-$C_1$- to $C_4$-alkylamino, aminosulphonyl, carboxamide, cyano, a carboxylic acid $C_1$- or $C_4$-alkyl ester, phenylazo or methylenedioxy, n denotes 0, 1, 2 or 3 and
$X^-$ denotes an anion,
wherein the cyclic and acyclic radicals can be substituted by $C_1$- to $C_4$-alkoxy, hydroxyl, fluorine, chlorine, bromine, amino, mono- or di-$C_1$- to $C_4$-alkylamino, aminosulphonyl, carboxamide, cyano or a carboxylic acid $C_1$- to $C_4$-alkyl ester and cyclic radicals can additionally be substituted by $C_1$- to $C_4$-alkyl, and a benzene, cyclohexyl or cyclopentyl ring can be fused onto the ring a.
R preferably represents a $C_1$- to $C_5$-alkyl radical, in particular methyl or ethyl.
Preferred optionally substituted $C_1$- to $C_4$-alkyl radicals $R_1'$ and $R_2'$ are the methyl, ethyl, n-propyl, isopropyl, n-butyl and isobutyl radical and their derivatives which can be substituted by a carboxylic acid methyl ester, a carboxylic acid ethyl ester, carboxamide, cyano, methoxy, ethoxy, hydroxyl, chlorine or bromine, preferably unsubstituted alkyl, in particular methyl or ethyl.
Optionally substituted phenyl-$C_1$- to $C_3$-alkyl radicals $R_1'$ and $R_2'$ are preferably understood as meaning the benzyl, $\alpha$- or $\beta$-phenylethyl, or $\alpha$-, $\beta$- or $\gamma$-phenylpropyl radical which can be substituted in the ring by methyl, ethyl, chlorine, bromine, methoxy, ethoxy, hydroxyl, cyano, carboxamide or carboxylic acid methyl or ethyl ester groups. Unsubstituted radicals, and among these in turn benzyl radicals, are preferred.
Optionally substituted $C_3$- to $C_4$-alkylene radicals $R_1'$ and $R_2'$ are preferably understood as meaning the allyl, but-1-en-4-yl, but-2-en-1-yl and 2-methyallyl radical, which can be substituted by chlorine, bromine, methoxy, ethoxy, hydroxyl, cyano, carboxamide or a carboxylic acid methyl or ethyl ester.

Optionally substituted cycloalkyl radicals $R_1'$ and $R_2'$ are preferably understood as meaning the cyclopentyl or cyclohexyl radical, which can be substituted by $C_1$- to $C_4$-alkyl groups. The 4-methyl-cyclohex-1-yl radical may be considered as an example.

An optionally substituted phenyl radical $R_2'$ is preferably understood as meaning the phenyl radical and its derivatives which can be substituted by fluorine, chlorine, bromine, methoxy, ethoxy, hydroxyl, cyano, carboxamide or a carboxylic acid methyl or ethyl ester. The phenyl radical is preferred.

Optionally substituted $C_2$- or $C_3$-alkylene or cyclohexylene bonded to the phenyl ring a are understood as meaning in particular the ethan-1,2-diyl, propan-1,3-diyl or cyclohexan-1,2-diyl radical, which can be substituted by $C_1$- to $C_4$-alkyl groups.

Preferred alkylene radicals $R_2$ are the ethan-1,2-diyl, propan-2,3-diyl, propan-1,3-diyl and 2-methylpentan-2,4-diyl radical.

Those solvents which are not miscible with water, such as benzene, chlorobenzene, toluene or xylene, are preferably used as solvents for the reaction with compounds II.

The base for the reaction with nitrates III is preferably an alkali metal hydroxide, alkaline earth metal hydroxide, alkaline earth metal oxide or an organic ammonium hydroxide.

A preferred embodiment of the process according to the invention consists in carrying out all stages without intermediate isolating as a one-vessel process.

Compared with processes of the state of the art the process has several important advantages.

German Patent Specification No. 1,133,054 has disclosed a process for the preparation of basic dyestuffs, which is characterised in that pyridine-4-aldehyde is condensed with arylhydrazines and the reaction product is then alkylated at the pyridine-nitrogen, or azomethine which can be obtained from alkylated γ-picoline and p-nitroso-dimethylaniline is reacted with arylhydrazines. This process has the disadvantage that the starting compounds are accessible only with difficulty. Thus, pyridine-4-aldehyde is an expensive commercial product, and azomethine formed from quaternised γ-picoline and p-nitroso-dimethylaniline cannot be prepared in high yields.

According to F. Kröhnke et al., Chem. Ber. 90, 2792–2800 (1957), a yield of this product of only about 37% of theory is thus obtained by a piperidine-catalysed reaction at 80° C. of an equimolar mixture of n-methyl-γ-picolinium iodide and p-nitroso-dimethylaniline. Furthermore, compounds of this type must eliminate on condensation with hydrazines per mol of the quantity used 1 mol of a p-amino-dialkylaniline which has to be destroyed because it is a by-product obtained at a fortiori and of no value. The process disclosed in German Patent Specification No. 1,133,054 also requires an intermediate isolating to be carried out, which step can be omitted in the process described here.

European Patent Application No. 8,323 describes a process for the preparation of pyridine-aldehyde-hydrazones, some of which can be converted into dyestuffs of the formula I by quaternisation. The hydrazones can be prepared by condensing aminomethylpyridine with aldehydes or ketones, subsequent isomerisation of the azomethine double bond and a further condensation with hydrazines. This process has the disadvantage that 4-aminomethylpyridine, the preparation of which by methods described in the literature is expensive, has to be used as a starting material. A further disadvantage of this process is that it necessarily produces organic amines which cannot be utilised in a useful manner.

The new process overcomes the disadvantages of the known processes for the preparation of compounds of the formula I by 1. using inexpensive γ-picoline as a starting material,
2. reaching in one step in a high yield the oxidation stage of an aldehyde, and
3. it being able to dispense with intermediate isolating steps.

EXAMPLE 1

48.0 g of γ-picoline are initially introduced, 65.0 g of dimethyl sulphate are added dropwise at 85°–90° C. and the mixture is stirred further for 1 hour at this temperature. 75.0 g of water are then added to it and 100 g of methanol are added at 40° C. After cooling to 0°–5° C., a mixture of 40 g of sodium hydroxide, 60 g of water and 40 g of methanol is then added dropwise at this temperature. 47.0 g of gaseous methyl nitrite are then passed in at such a rate, while stirring vigorously, that as much as possible of it is taken up. Stirring is continued for 1 hour at 0°–5° C. and 96 g of concentrated hydrochloric acid are then added dropwise below 10° C. After the addition of 150 g of water, 180 g of liquid are removed from the batch by distillation. 54.0 g of phenylhydrazine are then added at 80° C. to the distillation residue and the pH value is lowered by means of concentrated hydrochloric acid to 0.7. After stirring for 8 hours at 80° C., the mixture is allowed to cool down to 30° C. The pH of the batch is adjusted by means of concentrated sodium hydroxide solution to 7 and stirring is continued for a further 3 hours at 0°–5° C. After filtering with suction, thorough pressing off and drying in vacuo at 50° C., the dyestuff of the formula

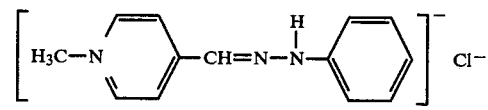

is obtained in a yield of 75% of theory, relative to the γ-picoline employed.

This product can be reacted further as follows:

The solid is introduced into 820 g of water at 20°–25° C. and the mixture is stirred for about 1 hour. It is then filtered and 75.4 g of benzenesulphonic acid methyl ester are added to the clear filtrate. After the addition of 77.8 g of a 30% strength sodium hydroxide solution, the batch is stirred for 5 hours at 20°–25° C. The pH value is adjusted by means of concentrated hydrochloric acid to 4 and the mixture is heated for 2 hours at 80° C., the pH value being corrected if appropriate.

After cooling to 30° C., the batch is concentrated to dryness in vacuo at a bath temperature of 60° C. and the solid product obtained is then dried further at 50° C. in vacuo overnight.

A quantitative yield of the dyestuff of the formula

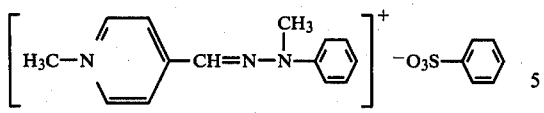

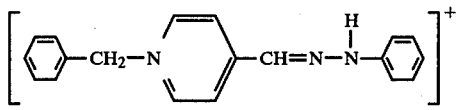

in a mixture with colourless salts is obtained.

It dyes polyacrylonitrile in a clear, light-fast, greenish-tinged yellow and has very good levelling properties.

EXAMPLE 1a 48.0 g of γ-picoline are initially introduced and heated to the boil at a bath temperature of 160° C. After the dropwise addition of 68.5 g of 1-bromobutane this bath temperature is maintained for a further 1.5 hours, and the procedure followed thereafter is that which starts in sentence 2 of Example 1. A yellow dyestuff having the chromophoric cation of the formula

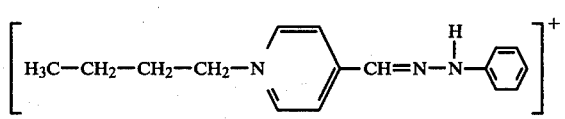

is obtained in a similarly high yield as described in Example 1 by carrying out an isolation using the operations described in Example 1.

EXAMPLE 1b 48.0 g of γ-picoline are initially introduced and heated to 85°–90° C. The heating is then removed and a total of 77.1 g of diethyl sulphate are then added dropwise at such a rate that the temperature is continued to be maintained between 85° and 90° C. Stirring is then continued for a further hour at 90° C. and the procedure followed thereafter is as in Example 1, sentence 2. After carrying out the operations described in Example 1, a yellow dyestuff having the chromophoric cation of the formula

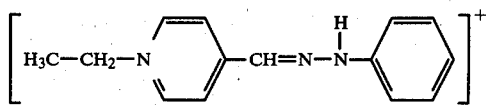

is obtained in a high yield.

EXAMPLE 1c 48.0 g of γ-picoline, dissolved in 130 g of chlorobenzene, are initially introduced and the mixture is heated up to the reflux temperature. At this temperature, 63.3 g of benzyl chloride are added dropwise in the course of 0.5 hour and stirring is continued for a further 2 hours under reflux. 200 g of water are then added, and chlorobenzene is distilled off with steam. The mixture is then concentrated to such an extent by distilling off water that the weight of the batch is 186 g. 100 g of methanol are added and the procedure then followed is that which starts in sentence 3 of Example 1. After carrying out the operations described in Example 1 a yellow dyestuff having the chromophoric cation of the formula is obtained.

EXAMPLE 2

At first the procedure of Example 1 is followed. After the distilling-off of 180 g of liquid, 112 g of 4-hydrazobenzenesulphonamide hydrochloride are added and the pH value is adjusted by means of concentrated hydrochloric acid to 0.5. The mixture is heated for 8 hours at 80° C. while stirring. After cooling down, the pH value is adjusted to 7 by means of concentrated sodium hydroxide solution. After stirring for 3 hours at 0°–5° C., the mixture is filtered with suction and the dyestuff of the formula

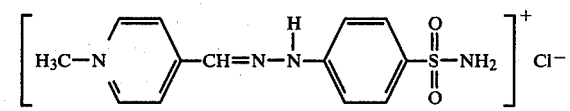

is obtained in a very high yield after drying in vacuo at 50° C. If the procedure of Example 1a, 1b or 1c is initially followed and thereafter the procedure of Example 2 analogously, derivatives which correspondingly have different substituents on the pyridine-nitrogen are obtained in likewise high yields.

EXAMPLE 3

The procedure of Example 1 is initially followed. After the passing-in of methyl nitrite, further stirring and dropwise addition of 96 g of concentrated hydrochloric acid, the reaction batch is concentrated under a water-jet vacuum at a bath temperature of 60° C. until nothing passes over any more. 370 g of water and 215 g of concentrated hydrochloric acid are then added, and 119 g of the sodium salt of N-(4-methoxyphenyl)-hydrazine-N'-sulphonic acid are added to the mixture. After stirring for a total of 24 hours at 20°–25° C., the product is filtered off with suction and the red, finely crystalline solid of the formula

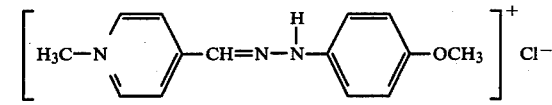

is dried in vacuo at 50° C.

If initially the procedure of Example 1a, 1b or 1c and thereafter a procedure analogous to that of Example 3 is followed, similar yields are obtained of derivatives which are correspondingly differently substituted at the pyridine-nitrogen.

EXAMPLE 4

Initially the procedure of Example 1 is followed. After the distilling-off of 180 g of liquid, 94.8 g of 3-nitrophenylhydrazine hydrochloride are added and the pH value is lowered to 0.7 by means of concentrated hydrochloric acid. After stirring for 8 hours at 80° C., the mixture is cooled to 5° C. and maintained for 1 hour at this temperature, and the dyestuff of the formula

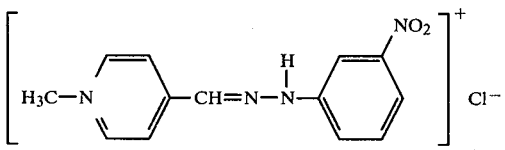

which has crystallised out is filtered off with suction. It can be dried in vacuo at 50° C.

If initially the procedure of Example 1a, 1b or 1c and thereafter a procedure analogous to that of Example 4 is followed, high yields are obtained of derivatives which are correspondingly differently substituted at the pyridine-nitrogen.

EXAMPLE 5

Initially the procedure of Example 1 is followed. After the distilling-off of 180 g of liquid, 81.8 g of 4-chlorophenylhydrazine sulphate are added to the residue of the distillation. The pH value is lowered by means of concentrated hydrochloric acid to 0.6 and stirring is carried out for 6 hours at 80° C. After cooling to 0°-5° C. and stirring for 3 hours at this temperature, the product is filtered off with suction and a high yield of the dyestuff of the formula

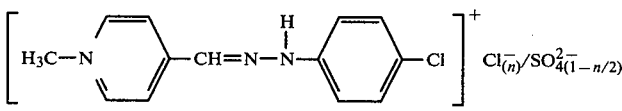

$0 < n < 1$ is obtained after drying in vacuo at 50° C.

If initially the procedure of Example 1a, 1b or 1c and thereafter a procedure analogous to that of Example 5 is followed, similar high yields are obtained of derivatives which are correspondingly differently substituted at the pyridine-nitrogen.

EXAMPLE 6

Initially the procedure of Example 1 is followed. After the distilling off of 180 g of liquid, 101 g of 2-nitrophenylhydrazine sulphate are added and the pH value is lowered to 0.6 by means of concentrated hydrochloric acid. After stirring for 5 hours at 90° C., the mixture is cooled to 20°-25° C., the reaction batch is diluted by means of the same amount of water, and 80 g of a 50% strength aqueous zinc chloride solution are then added dropwise. After stirring for 3 hours at 0°-5° C., the product is filtered off with suction and the dyestuff of the formula

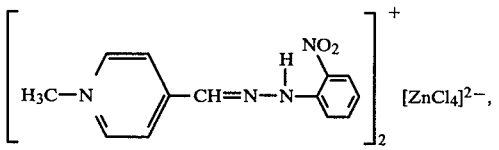

which can be dried in vacuo at 50° C., is thus isolated in a yield similar to that of Example 1.

If initially the procedure of Example 1a, 1b or 1c and thereafter a procedure analogous to that of Example 6 is followed, likewise high yields are obtained of derivatives which are correspondingly differently substituted at the pyridine-nitrogen.

If desired, the hydrogen-carrying hydrazone-nitrogen of the dyestuffs of Examples 2-6 can also be alkylated in likewise high yields as described in Example 1.

EXAMPLE 7

Initially the procedure of Example 1 is followed. After the distilling-off of 180 g of liquid, 93 g of 1-amino-2-methylindoline hydrochloride are added and the pH value is lowered to 0.6 by means of concentrated hydrochloric acid. After stirring for 8 hours at 80° C., 700 g of water are added and 80 g of a 50% strength aqueous zinc chloride solution are then added dropwise. After a further 1 hour's stirring, the product is filtered off with suction and dried in vacuo at 50° C. A reddish-tinged yellow dyestuff is obtained, the cation of which can be represented by the following formula:

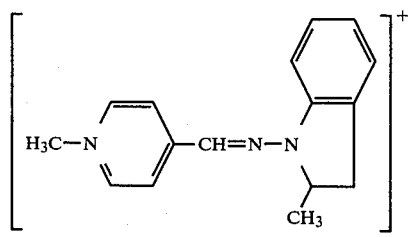

If initially the procedure of Example 1a, 1b or 1c and thereafter a procedure analogous to that of Example 7 is followed, derivatives are obtained which are correspondingly differently substituted at the pyridine-nitrogen.

I claim:

1. A process for the preparation of a cationic hydrazone dyestuff of the formula

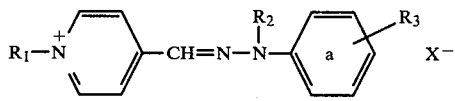

wherein
$R_1$ is alkyl, alkenyl, aralkyl or cycloalkyl,
$R_2$ is hydrogen, alkyl, alkenyl, aryl, aralkyl or cycloalkyl, or alkylene bonded to the ring a,
$R_3$ is hydrogen or one or more non-ionic substituents customary in dyestuff chemistry, and
$X^-$ is an anion,
wherein an aromatic or cycloaliphatic ring can be fused to the ring a, and wherein the radicals mentioned can carry non-ionic substituents customary in dyestuff chemistry, comprising treating 4-methylpyridine with a quaternising agent of the formula $R_1$—X at −20° C. up to the boiling point of the system, reacting the resulting product with a base and a nitrite of the formula

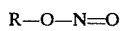

wherein
R is an organic radical,
at a temperature from −20° C. to +60° C., and reacting the product at a pH below 7 with a hydrazine of the formula

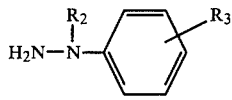

or with a hydrazosulphonate of the formula

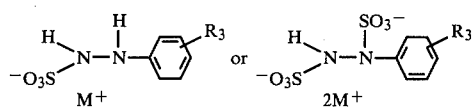

wherein
$M^+$ is a monovalent metal cation or a mono-valent organically substituted ammonium cation or one equivalent of a divalent cation,
at a temperature from −20° C. up to the boiling point of the system.

2. A process for the preparation of a cationic hydrazone dyestuff of the formula

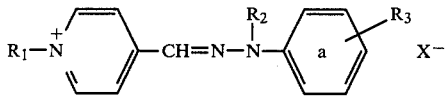

wherein
$R_1$ is alkyl, alkenyl, aralkyl or cycloalkyl,
$R_2$ is alkyl, alkenyl or aralkyl, aralkyl or cycloalkyl, or alkylene bonded to the ring a,
$R_3$ is hydrogen or one or more non-ionic substituents customary in dyestuff chemistry, and
$X^-$ is an anion,
wherein an aromatic or cycloaliphatic ring can be fused to the ring a, and wherein the radicals mentioned can carry non-ionic substituents customary in dyestuff chemistry, comprising treating 4-methylpyridine with a quaternising agent of the formula

at −20° C. up to the boiling point of the system, reacting the resulting product with a base and a nitrite of the formula

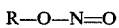

wherein
R is an organic radical,
at a temperature from −20° C. to +60° C., reacting the product at a pH below 7 with a hydrazine of the formula

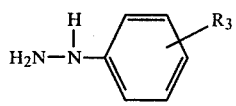

or with a hydrazosulphonate of the formula

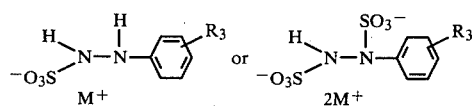

wherein
$M^+$ is a monovalent metal cation or a mono-valent organically substituted ammonium cation or one equivalent of a divalent cation,
at a temperature from −20° C. up to the boiling point of the system, and reacting the product with a compound of the formula

3. Process according to claim 1 for the preparation of a dyestuff of the formula

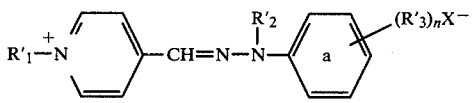

wherein
$R_1'$ denotes $C_1$- to $C_4$-alkyl, $C_3$- to $C_4$-alkenyl, phenyl-$C_1$- to $C_3$-alkyl, cyclopentyl or cyclohexyl, $R_2'$ denotes hydrogen, $C_1$- to $C_4$-alkyl, $C_3$- to $C_4$-alkenyl, phenyl, phenyl-$C_1$- to $C_3$-alkyl, cyclopentyl or cyclohexyl, or cyclohexylene or $C_2$- or $C_3$-alkylene bonded to the ring a,
$R_3'$ denotes $C_1$- to $C_4$-alkyl, $C_1$- to $C_4$-alkoxy, hydroxyl, chlorine, bromine, nitro, amino, mono- or di-$C_1$- to $C_4$-alkylamino, aminosulphonyl, carboxamide, cyano, a carboxylic acid $C_1$- to $C_4$-alkyl ester, phenylazo or methylenedioxy, n denotes 0, 1, 2 or 3 and
$X^-$ denotes an anion,
wherein the cyclic and acyclic radicals can be substituted by $C_1$- to $C_4$-alkoxy, hydroxyl, fluorine, chlorine, bromine, amino, mono- or di-$C_1$- to $C_4$-alkylamino, aminosulphonyl, carboxamide, cyano or a carboxylic acid $C_1$- to $C_4$-alkyl ester and cyclic radicals can additionally be substituted by $C_1$- to $C_4$-alkyl, and a benzene, cyclohexyl or cyclopentyl ring can be fused onto the ring a.

4. Process according to claim 1, wherein
$R_1$ represents methyl, ethyl or benzyl,
$R_2$ represents hydrogen, methyl or 2-methylethylene and
$R_3$ represents hydrogen, methyl, methoxy, ethoxy, chlorine, nitro or sulphonamide.

5. Process according to claim 1, wherein
$R_1$ represents methyl and
$R_2$ and $R_3$ represent hydrogen.

6. Process according to claim 1, wherein the base used is an alkali metal hydroxide, an alkaline earth metal hydroxide, an organic ammonium hydroxide or an alkaline earth metal oxide.

7. Process according to claim 6, wherein sodium hydroxide or potassium hydroxide is used as an alkali metal hydroxide.

8. Process according to claim 1, wherein the radical R is an alkyl radical having 1-5 C atoms.

9. Process according to claim 8, wherein R is methyl or ethyl.

10. Process according to claim 1, wherein two or more reaction steps are carried out as a one-vessel reaction.

11. Process according to claim 2, wherein all reaction steps are carried out as a one-vessel process.

* * * * *